Figure 2:
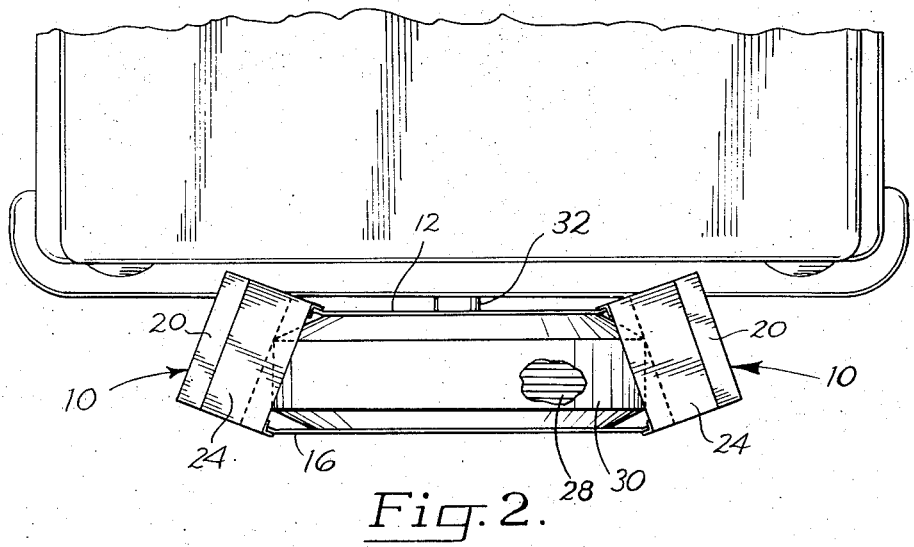

United States Patent [19]
Harkey et al.

[11] 3,828,879
[45] Aug. 13, 1974

[54] SPARE TIRE MOUNTED, MOTOR VEHICLE RADIATOR COOLING APPARATUS

[76] Inventors: Fred W. Harkey; Thelma F. Harkey, both of 333-32nd Ave., Longview, Wash. 98632

[22] Filed: Mar. 16, 1973

[21] Appl. No.: 342,188

[52] U.S. Cl............... 180/54 A, 138/103, 165/44, 224/42.06
[51] Int. Cl............................................ B60k 11/02
[58] Field of Search ...... 180/68 R, 68 P, 54 A, 1 R; 296/37.2, 1, 91; 165/44; 62/241; 224/42.12, 42.2, 42.01, 42.04, 42.06; 138/103, 106

[56] References Cited
UNITED STATES PATENTS

| | | | |
|---|---|---|---|
| 2,871,968 | 2/1959 | Giacosa | 180/54 A |
| 3,330,455 | 7/1967 | Cooper | 224/42.06 |
| 3,425,605 | 2/1969 | Triboulet | 224/42.06 |
| 3,482,749 | 12/1969 | Cooper | 224/42.06 X |

FOREIGN PATENTS OR APPLICATIONS

| | | | |
|---|---|---|---|
| 347,314 | 1/1922 | Germany | 180/68 R |
| 874,335 | 4/1942 | France | 296/37.2 |

*Primary Examiner*—David Schonberg
*Assistant Examiner*—Milton L. Smith

[57] ABSTRACT

Apparatus for directing a flow of cooling air against the radiator of a moving motor vehicle vertically mounting a spare tire at the front of the vehicle across the radiator face comprises at least one air scoop arranged to deflect a flow of air generated by the motion of the vehicle against the radiator face behind the tire, and means for mounting the scoop gravitationally on the upper portion of the tire.

6 Claims, 2 Drawing Figures

PATENTED AUG 13 1974 3,828,879

SPARE TIRE MOUNTED, MOTOR VEHICLE RADIATOR COOLING APPARATUS

This invention relates to apparatus for cooling the radiators of motor vehicles.

For reasons of convenience and accessibility, the spare tires of campers and trucks frequently are mounted at the front of the vehicle, usually in a vertical position, directly in front of the radiator grille, and spaced horizontally only a short distance from the latter. The appearance of the spare tire then is improved by covering it with an air-impervious plastic or fabric cover.

When the vehicle is driven at normal highway speeds, mounting the spare tire in this manner does not interfere with the efficiency of operation of the engine. However, on long grades where it becomes necessary to reduce the vehicle speed, the covered spare tire operates as a shield and prevents the normal flow of cooling air from passing through the radiator. This effect is noted particularly when the vehicle concerned is a heavy camper or truck. As a consequence, on such grades the engine tends to overheat.

It is the general purpose of the present invention to provide cooling apparatus for overcoming this problem by directing a flow of air behind the spare tire and against the radiator so that efficient cooling of the engine is obtained, even at low vehicle speeds.

It is a further important object of the present invention to provide cooling apparatus for directing a flow of cooling air against the radiator of a vehicle having a front-mounted spare tire, which apparatus is mounted gravitationally directly upon the tire, without modification of either the tire assembly or of the vehicle.

Another object of the present invention is the provision of motor vehicle radiator cooling apparatus which is simple in construction, universally applicable to vehicles equipped with spare tires of various sizes, maintenance free, and low in cost.

In essence, the motor vehicle radiator cooling apparatus of my invention comprises at least one, preferably a pair, of air scoops arranged in the front of the vehicle to deflect a flow of air generated by the motion of the latter behind the tire and against the radiator face, together with appropriate mounting means for mounting the apparatus directly on the tire. The mounting means in turn basically comprises a cage formed by the air scoops and connecting tie bars which seats over the top of the tire, where it is retained in position gravitationally by the weight of the apparatus and frictionally by contact with the exterior surface of the tire.

Figure 1:
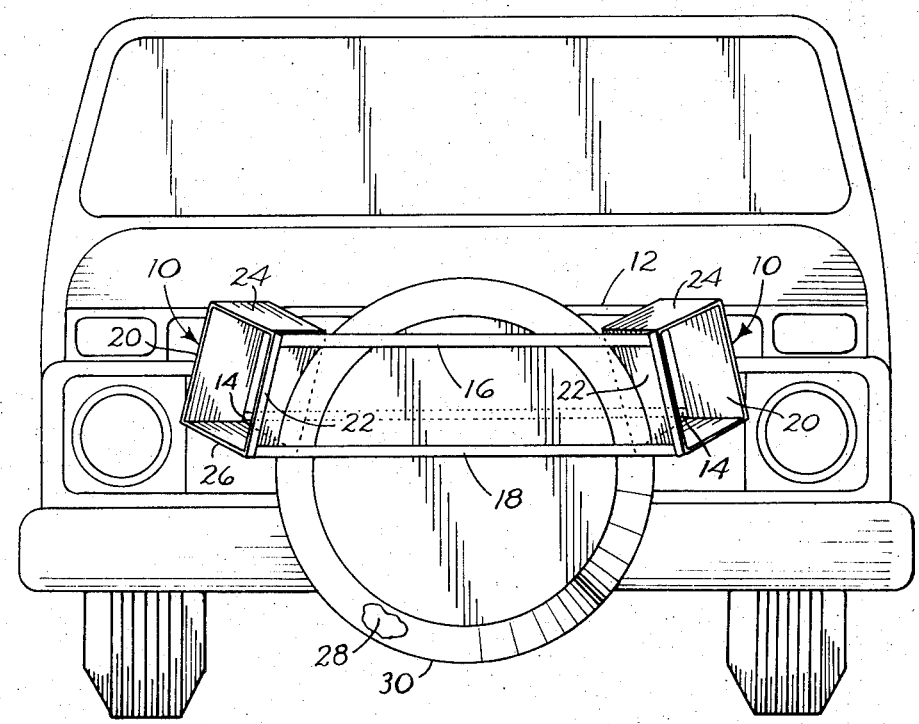

Considering the foregoing in greater detail and with particular reference to the drawings wherein:

FIG. 1 is a view in front elevation and FIG. 2 is a view in plan of the hereindescribed motor vehicle radiator cooling apparatus illustrated in its use position seated gravitationally on the upper portion of a spare tire mounted vertically across the front of the vehicle.

As shown in the form of the invention illustrated in the drawings, the apparatus comprises a pair of air scoops indicated generally at 10, interconnected by a plurality of vertically and horizontally spaced tie bars 12, 14, 16, 18.

Air scoops 10 basically comprise short conduits which may be rectangular in cross section and of a size sufficient to generate the desired air flow. They may be fabricated from sheet metal, plastic, or other suitable structural material.

Each scoop 10 is comprised of opposite sides 20, 22, a top 24 and a bottom 26. The outer face of side 22 is adapted to bear against the peripheral surface of a tire 28 covered with a cover 30 and attached in conventional manner to the front of the vehicle by attaching means indicated schematically at 32, FIG. 2.

Tie bars 12, 14, 16, 18 also are fabricated from suitable structural material. They preferably comprise metal bars welded or riveted to the four corners of the scoops. Their lengths are predetermined to cause the scoops to lie at an angle to the direction of motion of the vehicle. In this position they serve as baffles, generating an air flow which is diverted to the area behind the tire and impinges on the radiator when the vehicle is in motion.

It is a particular feature of the invention that the means by which the radiator cooling apparatus is mounted is of such a nature that the apparatus may be put in place with a minimum of effort and without any modification whatsoever of the tire, its mounting bracket, or the vehicle.

As is particularly apparent in FIG. 2, the disposition and spacing of the two scoops and the four tie bars is such that they form a cage which may be slipped over the top of the tire until the opposite sides of the two scoops bear against the outer peripheral surface of the latter. These surfaces prevent endwise motion of the assembly; the tie bars prevent lateral motion thereof. The weight of the apparatus is sufficient so that it seats gravitationally over the tire and thus is self-mounting. Frictional engagement with the tire prevents slippage. When not in use, it may be removed simply by lifting it off the tire and stored pending a subsequent application.

When the application is in place on the tire and the vehicle is under way, a substantial flow of air is directed by the scoops into the space behind the tire, where it is driven through the radiator grille and directed against the radiator. The radiator thus is cooled efficiently even though the vehicle is moving slowly, as when it is ascending a long grade.

Having thus described our invention in preferred embodiments, we claim:

1. Apparatus for directing a flow of cooling air against the radiator of a moving motor vehicle vertically mounting a spare tire across the radiator face, comprising:
   a. at least one air scoop arranged to deflect the flow of air generated by the motion of the vehicle behind the tire and against the radiator face and
   b. air scoop mounting means gravitationally seating the air scoop on the upper portion of the tire, opposite the radiator.

2. The apparatus of claim 1 wherein there are two air scoops on the mounting means, one on each side of the tire.

3. The apparatus of claim 1 wherein there are two air scoops on the mounting means, one on each side of the tire, and tie bar means interconnecting the air scoops in front and in back of the tire, forming a restraining cage for the assembly.

4. The apparatus of claim 2 wherein the air scoops comprise short conduits open at both ends and directed inwardly behind the tire against the radiator face.

5. The apparatus of claim 2 wherein the air scoops are provided with opposed side faces angled to conform to the peripheral contour of the tire and to bear against the same, thereby supporting the apparatus.

6. The apparatus of claim 2 wherein the air scoops comprise short conduits open at both ends, directed inwardly behind the tire against the radiator face, and provided with opposite sides angled to conform to the peripheral contour of the tire and to bear against the same, thereby supporting the apparatus.

* * * * *